(12) United States Patent  (10) Patent No.: US 8,714,817 B2
Oyaizu  (45) Date of Patent: May 6, 2014

(54) RADIATION IMAGING APPARATUS

(75) Inventor: Keisuke Oyaizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/489,658

(22) Filed: Jun. 6, 2012

(65) Prior Publication Data

US 2012/0314838 A1  Dec. 13, 2012

(30) Foreign Application Priority Data

Jun. 9, 2011 (JP) ................. 2011-129539

(51) Int. Cl.
H01J 31/49 (2006.01)
(52) U.S. Cl.
USPC ........................................ 378/189
(58) Field of Classification Search
USPC .............. 378/62, 98.8, 154, 168, 189
See application file for complete search history.

(56) References Cited

U.S. PATENT DOCUMENTS 7,180,073 B2 * 2/2007 Tetsuo ............... 250/370.08

FOREIGN PATENT DOCUMENTS

JP  2005006806 A  1/2005

* cited by examiner

Primary Examiner — Courtney Thomas
(74) Attorney, Agent, or Firm — Canon USA Inc. IP Division

(57) ABSTRACT

A radiation imaging apparatus includes a grid holding unit including a grid for preventing scattering of X-rays, an imaging unit configured to capture an X-ray image, and a handle unit including a gripping handle. One of the grid holding unit, the imaging unit, and the handle unit includes a first detaching regulation unit configured to combine the grid holding unit and the imaging unit, a second detaching regulation unit configured to combine the imaging unit and the handle unit, a third detaching regulation unit configured to combine the grid holding unit and the handle unit, and an unlocking mechanism.

18 Claims, 7 Drawing Sheets

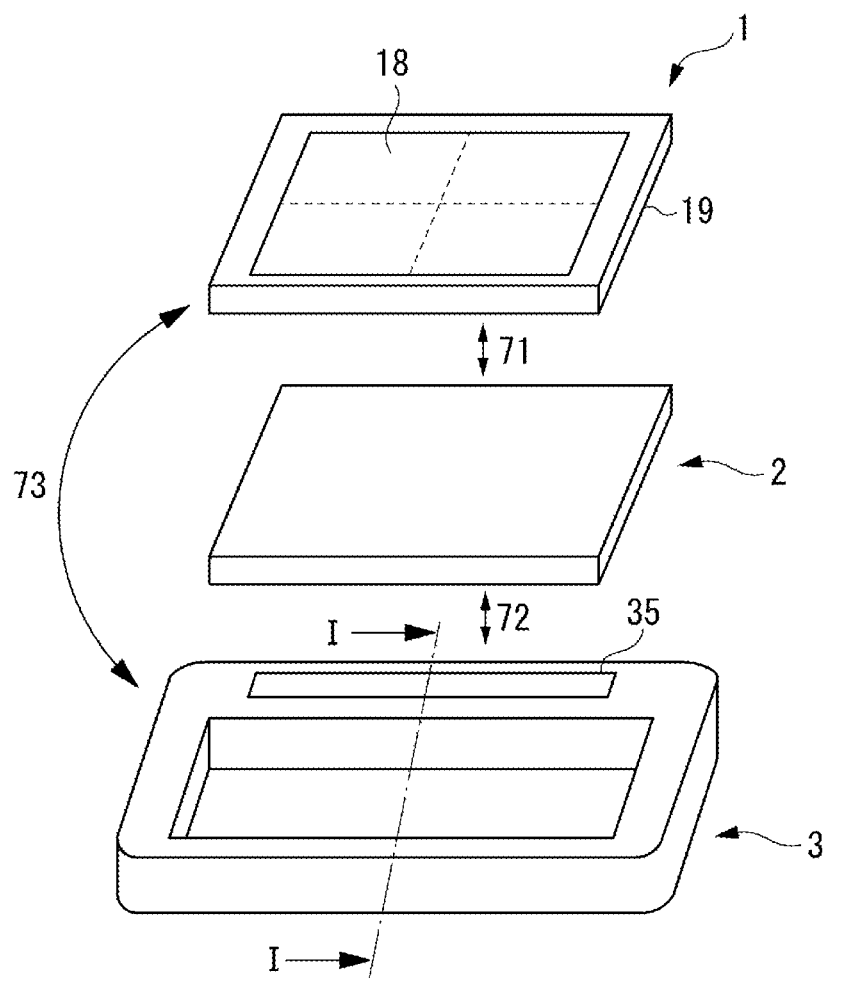

RADIATION IMAGING APPARATUS

BACKGROUND OF THE INVENTION

1. Field of the Invention

The present invention relates to a radiation imaging apparatus that acquires a radiation image from radiation transmitted through a subject.

2. Description of the Related Art

As a radiation imaging apparatus, there is widely used a digital X-ray imaging apparatus that uses digital radiography for instantaneously displaying a captured image on a monitor. Conventionally, the imaging apparatus of this type has been installed in a radiation room to be utilized. Recently, however, there is a big demand for a portable imaging apparatus (electronic cassette) to enable quick image-capturing operations throughout a medical facility.

Mainstream among such portable imaging apparatuses is a product having a handle for portability. However, the handle may be an obstacle for a certain imaging method. This requires the handle to be detachable.

Further, to enable image-capturing of a region such as a chest or an abdomen of a patient where many scattered rays maybe generated, there is a demand for a mechanism (grid holding unit) for holding a grid to remove the scattered rays. Thus, an X-ray imaging apparatus discussed in Japanese Patent Application Laid-Open No. 2005-6806 includes a case provided with a handle used for carrying, to which the electronic cassette and the grid can be detachably mounted.

In the X-ray imaging apparatus discussed in Japanese Patent Application Laid-Open No. 2005-6806, the three units, i.e., the electronic cassette, the handle, and the grid, can be combined. Operating the handle enables replacement of the grid from the combined state of the three units. The electronic cassette can also be taken out. However, the X-ray imaging apparatus discussed in Japanese Patent Application Laid-Open No. 2005-6806 additionally needs a grid holding unit to combine the electronic cassette and the grid by removing the handle.

SUMMARY OF THE INVENTION

The present invention is directed to a radiation imaging apparatus in which two of a unit having an electronic cassette, a unit having a grid, and a unit having a handle can be arbitrarily combined. The present invention is further directed to a radiation imaging apparatus that can improve operability by simplifying an operation content to remove arbitrary one of three units from the combined state.

According to an aspect of the present invention, a radiation imaging apparatus includes a grid holding unit including a grid for preventing scattering of X-rays, an imaging unit configured to capture an X-ray image, and a handle unit including a gripping handle, wherein one of the grid holding unit, the imaging unit, and the handle unit includes a first detaching regulation unit configured to combine the grid holding unit and the imaging unit to be separable, a second detaching regulation unit configured to combine the imaging unit and the handle unit to be separable, a third detaching regulation unit configured to combine the grid holding unit and the handle unit to be separable, and a releasing mechanism configured to release, by one releasing operation, while maintaining a combined state of one of the first detaching regulation unit, the second detaching regulation unit, and the third detaching regulation unit, combined states of the remaining two units.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is an exploded perspective view illustrating a configuration of a radiation imaging apparatus according to each of first to third exemplary embodiments.

DESCRIPTION OF THE EMBODIMENTS

Figure 2A:
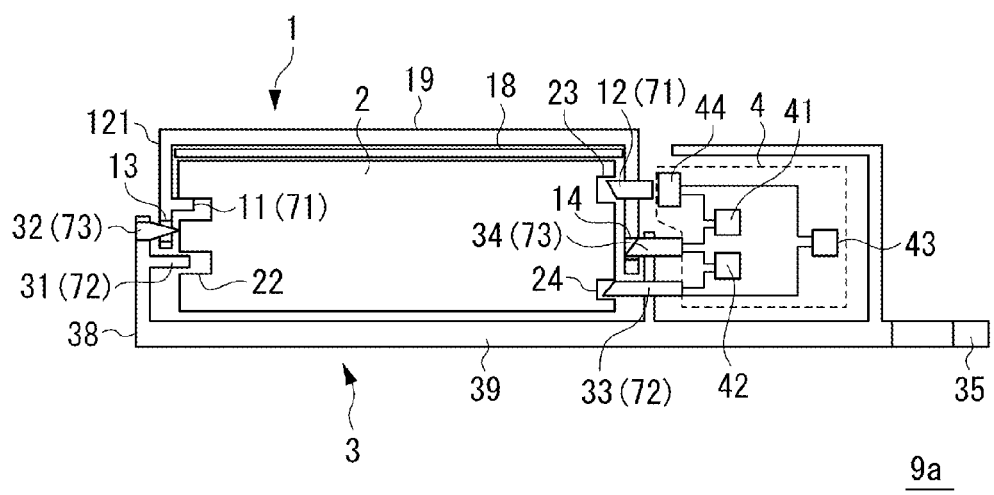
FIGS. 2A to 2D are sectional views each taken along the line I-I illustrated in FIG. 1, schematically illustrating the configuration of the radiation imaging apparatus according to the first exemplary embodiment.

Various exemplary embodiments, features, and aspects of the invention will be described in detail below with reference to the drawings.

First, an overall configuration common among radiation imaging apparatuses 9a to 9c according to first to third exemplary embodiments of the present invention is described in a general manner.

FIG. 1 is an exploded perspective view schematically illustrating the configuration of each of the radiation imaging apparatuses 9a to 9c according to the first to third exemplary embodiments of the present invention. As illustrated in FIG. 1, each of the radiation imaging apparatuses 9a to 9c according to the first to third exemplary embodiments of the present invention includes three units such as a grid holding unit 1, an imaging unit 2, and a handle unit 3. FIG. 1 illustrates a detaching relationship among the grid holding unit 1, the imaging unit 2, and the handle unit 3.

Each of the radiation imaging apparatuses 9a to 9c according to the first to third exemplary embodiments of the present invention includes a first detaching regulation unit 71, a second detaching regulation unit 72, and a third detaching regulation unit 73 (described in detail below). As illustrated in FIG. 1, the grid holding unit 1 and the imaging unit 2 are combined by the first detaching regulation unit 71. The imaging unit 2 and the handle unit 3 are combined by the second detaching regulation unit 72. The grid holding unit 1 and the handle unit 3 are combined by the third detaching regulation unit 73.

The grid holding unit 1, the imaging unit 2, and the handle unit 3 can be selectively assembled in various combinations depending on the desired application. For convenience, a state where the grid holding unit 1 and the imaging unit 2 are combined (assembled together) is referred to as a first state. A state in which the imaging unit 2 and the handle unit 3 are combined (assembled together) is referred to as a second state. A state where the grid holding unit 1 and the handle unit 3 are combined is referred to as a third state. A state in which the grid holding unit 1, the imaging unit 2 and the handle unit 3 are assembled together (combined) is referred to as a fourth state.

Figure 2B:
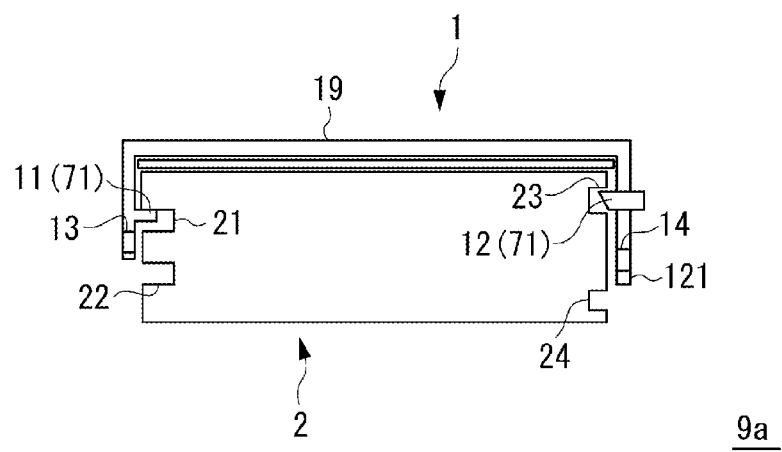
Figure 2C:
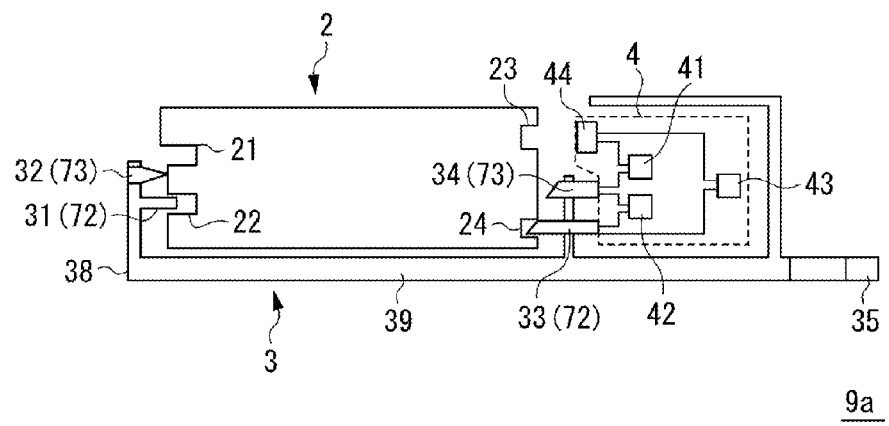
Figure 2D:
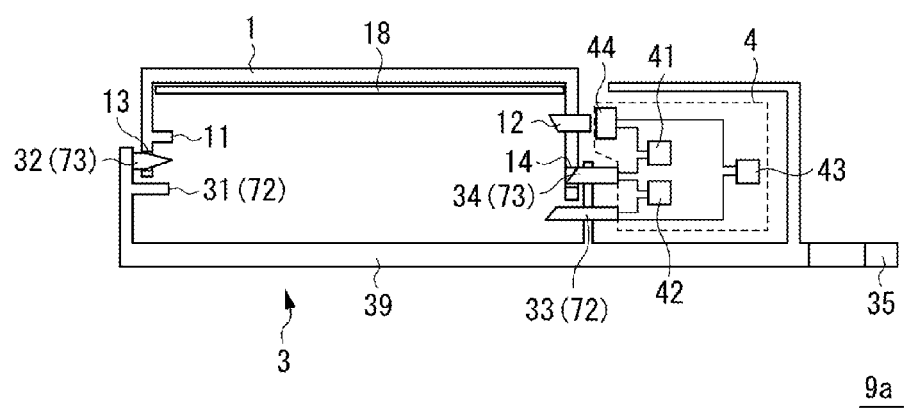

Next, the first exemplary embodiment of the present invention is described referring to FIG. 1 and FIGS. 2A to 2D. FIGS. 2A to 2D are sectional views each schematically illustrating the configuration of the radiation imaging apparatus 9a according to the first exemplary embodiment of the present invention. In the first exemplary embodiment of the present invention, FIG. 2A illustrates the fourth state, FIG. 2B illustrates the first state, FIG. 2C illustrates the second state, and FIG. 2D illustrates the third state. FIG. 2A is a sectional view taken along the line I-I illustrated in FIG. 1.

The grid holding unit 1 includes a grid 18 and a frame 19 for holding the grid 18. The grid 18 is a member for improving contrast by removing scattered rays. For the grid 18, a variety of conventionally well-known grids can be applied. The frame 19 is a mechanical structure for holding the grid 18.

The frame 19 is formed into substantially a quadrangular shape when seen from a plane, which has a shallow and substantially box-shaped or tray-shaped structure with one side being open. The grid 18 is located inside the frame 19 (area surrounded with a side wall 121: hereinafter referred to as a "housing area").

In the side wall 121 of the frame 19, a first fixed claw 11 and a first movable claw 12 are formed, and a first engaging hole 13 and a second engaging hole 14 are formed. Specifically, the first fixed claw 11 and the first engaging hole 13 are arranged in a predetermined side of the side wall 121. The first movable claw 12 and the second engaging hole 14 are arranged in a side opposite the predetermined side.

The first engaging hole 13 and the second engaging hole 14 are, for example, through-holes penetrating the side wall 121. The first fixed claw 11 is a convex structure projected to the inside of the housing area. As used herein a "convex portion" generally refers to a protruding portion having an outward surface and is not limited to curved or rounded surfaces. The first movable claw 12 can reciprocate substantially perpendicularly to a surface direction of the side wall 121. The first movable claw 12 can accordingly move to a state where its leading end projects into the housing area and to a state where the leading end exits from the housing area.

The housing area can accommodate the imaging unit 2. In the other side between the predetermined side of the side wall 121 and the side opposite the predetermined side, a notch through which the imaging unit 2 can pass is formed.

The handle unit 3 is a member in which a gripping handle 35 is disposed. The griping handle 35 is used for handling (carrying and positioning) the radiation imaging apparatus 9a according to the first exemplary embodiment of the present invention. There is no limitation to the configuration of the gripping handle 35.

For example, as illustrated in FIGS. 1 and 2A-2D, the handle unit 3 is formed into substantially a quadrangular shape, which has a shallow and substantially box-shaped or tray-shaped structure with one side being open. The imaging unit 2 can be accommodated inside an area surrounded with a side wall 38 of the handle unit 3 (hereinafter, this area is referred to as a "housing area").

In the side wall 38 of the handle unit 3, a second fixed claw 31, a second movable claw 32, a third movable claw 33, and a fourth movable claw 34 are formed. Specifically, as illustrated in FIG. 1 and FIGS. 2A to 2D, the second fixed claw 31 and the second movable claw 32 are arranged in a predetermined side of the side wall 38 (in the illustrated example, side opposite the side where the handle 35 is located).

In the side opposite the predetermined side (in FIG. 1 and FIGS. 2A to 2D, side where the handle 35 is disposed), the third movable claw 33 and the fourth movable claw 34 are arranged. In a side between the side of the side wall 38 where the second fixed claw 31 and the second movable claw 32 are arranged and the side where the third movable claw 33 and the fourth movable claw 34 are arranged, a notch through which the imaging unit 2 can pass is formed.

The second fixed claw 31 is a convex structure projected to the inside of the housing area. The second movable claw 32, the third movable claw 33, and the fourth movable claw 34, which can all reciprocate with respect to the side wall, can alternately move to a state where their leading ends enter into the housing area and to a state where the leading ends exit from the housing area.

The second movable claw 32, the third movable claw 33, and the fourth movable claw 34 are always automatically urged by a respective urging member, such as a spring or spring-loaded pin (not illustrated) so that their leading ends can enter into the housing area. In the leading ends of the second movable claw 32, the third movable claw 33, and the fourth movable claw 34, slopes inclined to an inner peripheral surface of the side wall 38 are formed.

Thus, when pressing forces parallel to the inner peripheral surface of the side wall 38 are applied to the slopes, by a force component perpendicular to the inner peripheral surface of the side wall 38, the second movable claw 32, the third movable claw 33, and the fourth movable claw 34 move to positions to exit from the housing area against the urging force of the urging member.

As illustrated in FIG. 2A, in the fourth state, the first movable claw 12, the third movable claw 33, and the fourth movable claw 34 are in positions to be completely projected into the housing area by the urging force of the urging member. When a force opposite the urging force of the urging member is applied, the first movable claw 12, the third movable claw 33, and the fourth movable claw 34 can move to exit positions from the housing area.

On the other hand, in the fourth state, the second movable claw 32 is not in a completely projected state because its leading end abuts on the imaging unit 2 while it is projected into the housing area by the urging force of the urging member. As illustrated in FIG. 2D, in a state where the imaging unit 2 is not accommodated in the housing area, projection into the housing area is greater than that in the fourth state.

When a force opposite the urging force of the urging unit is applied, the second movable claw can be retracted more than that in the state illustrated in Fig. A (projection amount into the housing area is smaller).

The imaging unit 2 is a device that can capture an X-ray image. The imaging unit 2 includes, for example, a fluorescent plate for converting an X-ray into visible light, a photoelectric conversion element for converting the visible light into an electric signal, and an electric circuit for subjecting the electric signal output from the photoelectric conversion element to A/D conversion. These members and the device are accommodated in the case.

In the imaging unit 2, a first concave portion 21, a second concave portion 22, a third concave portion 23, and a fourth concave portion 24 are formed. As used herein a "concave portion" refers to an inwardly hollowed surface and it is not limited to curved or circular surfaces. For example, a hollow or sunken notch (recess or dent) may be considered a "concave portion". The first fixed claw 11 of the grid holding unit 1 can be fitted in the first concave portion 21. The second fixed claw 31 of the handle unit 3 can be fitted in the second concave portion 22.

The first movable claw 12 of the grid holding unit 1 can be fitted in the third concave portion 23. The third movable claw 33 of the handle unit 3 can be fitted in the fourth concave portion 24.

There is no limitation to the configuration of the imaging unit 2. The imaging unit 2 can employ similar configuration to that of a well-known device capable of capturing various X-ray images (e.g., general "electronic cassette").

FIG. 2B is a sectional view schematically illustrating the first state (combined state of the grid holding unit 1 and the imaging unit 2). A user hooks the first fixed claw 11 of the grid holding unit 1 in the first concave portion 21 of the imaging unit 2, and then presses the imaging unit 2 to the first movable claw 12.

The first movable claw 12 is accordingly fitted, after the exit from the housing area, into the third concave portion 23 automatically by the urging force of the urging member. As a result, the two units, i.e., the grid holding unit 1 and the imaging unit 2, are combined.

FIG. 2C is a sectional view schematically illustrating the second state (combined state of the imaging unit 2 and the handle unit 3). The user hooks the second fixed claw 31 of the handle unit 3 in the second concave portion 22 of the imaging unit 2, and then presses the imaging unit 2 to the third movable claw 33. The third movable claw 33 accordingly moves to be automatically fitted into the fourth concave portion 24. As a result, the two units, i.e., the imaging unit 2 and the handle unit 3, are combined.

FIG. 2D is a sectional view schematically illustrating the third state (combined state of the grid holding unit 1 and the handle unit 3). The user presses, as illustrated in FIG. 2D, the grid holding unit 1 to the second movable claw 32 and the fourth movable claw 34. The second movable claw 32 accordingly moves to be automatically fitted into the first engaging hole 13, and the fourth movable claw 34 accordingly moves to be automatically fitted into the second engaging hole 14. As a result, the two units, i.e., the imaging unit 2 and the handle unit 3, are combined.

As described above, the first detaching regulation unit 71 illustrated in FIG. 1 includes the first fixed claw 11 and the first movable claw 12. The second detaching regulation unit 72 includes the second fixed claw 31 and the third movable claw 33. The third detaching regulation unit 73 includes the second movable claw 32 and the fourth movable claw 34.

Thus, the radiation imaging apparatus 9a according to the first exemplary embodiment of the present invention includes the three independent detaching regulation units, i.e., the first detaching regulation unit 71, the second detaching regulation unit 72, and the third detaching regulation unit 73. The operation of the first detaching regulation unit 71, the second detaching regulation unit 72, and the third detaching regulation unit 73 enables changing of the radiation imaging apparatus 9a according to the first exemplary embodiment of the present invention to one of the three states where two arbitrary units are combined.

The operation of combining the handle unit 3 with the grid holding unit 1 and the imaging unit 2 in the first state is as follows. The user fits the second fixed claw 31 of the handle unit 3 into the second concave portion 22 of the imaging unit 2, and the second movable claw 32 of the handle unit 3 into the first engaging hole 13 of the grid holding unit 1.

Then, the user presses the third movable claw 33 by the imaging unit 2, and the fourth movable claw 34 by the grid holding unit 1.

The third movable claw 33 accordingly moves to be automatically fitted into the fourth concave portion 24, and the fourth movable claw 34 moves to be automatically fitted into the second engaging hole 14. As a result, the radiation imaging apparatus 9a according to the first exemplary embodiment of the present invention is set in the fourth state.

The operation of fixing the grid holding unit 1 to the imaging unit 2 and the handle unit 3 in the second state is as follows. The user presses the second movable claw 32 of the handle unit 3 by the grid holding unit 1. The user accordingly fits the second movable claw 32 of the handle unit 3 into the first engaging hole 13 of the grid holding unit 1, and the first fixed claw 11 of the grid holding unit 1 into the first concave portion 21 of the imaging unit 2.

Then, the user presses the first movable claw 12 of the grid holding unit 1 to the imaging unit 2, and the grid holding unit 1 to the fourth movable claw 34 of the handle unit 3.

The first movable claw 12 of the grid holding unit 1 is accordingly fitted into the third concave portion 23 automatically, and the fourth movable claw 34 of the handle unit 3 into the second engaging hole 14 of the grid holding unit 1 automatically. As a result, the radiation imaging apparatus 9a according to the first exemplary embodiment of the present invention is set in the fourth state.

Figure 3:
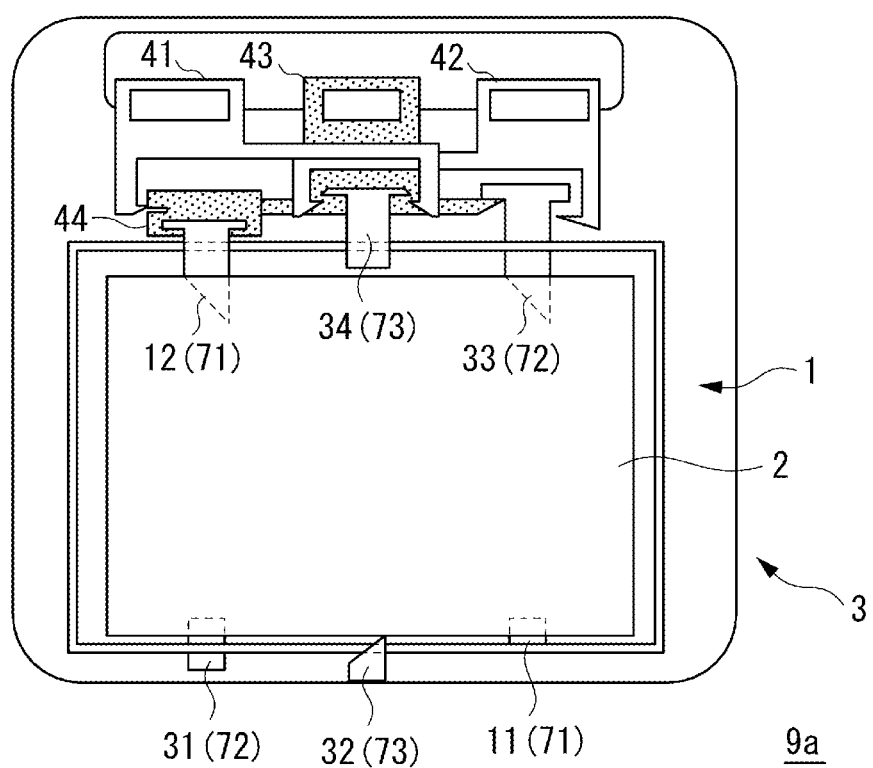
FIG. 3 is a sectional view schematically illustrating the configuration of the radiation imaging apparatus according to the first exemplary embodiment.

The operation of fixing the imaging unit 2 to the grid holding unit 1 and the handle unit 3 in the third state is described referring to FIGS. 1 to 3.

FIG. 3 is a sectional view taken along a surface parallel to a photographing surface (surface irradiated with X-ray), schematically illustrating the radiation imaging apparatus 9a in the fourth state according to the first exemplary embodiment of the present invention.

In this operation, the imaging unit 2 is slid from the side to be received in a space (housing area) formed by the grid holding unit 1 and the handle unit 3. In one side of the side wall 121 of the grid holding unit 1 and the side wall 38 of the handle unit 3, a notch into which the imaging unit 2 can be inserted is formed.

In FIG. 3, no notch is illustrated. However, a notch is formed on the left side. The user can insert or eject the imaging unit 2 from the housing area through this notch. In the first movable claw 12, the second movable claw 32, and the third movable claw 33, slopes are formed on their side faces (surface of a side opposite the side where the notch of the side wall 38 is formed, left side in FIG. 3) so that they can move when pressed from the side.

The first concave portion 21 and the second concave portion 22 of the imaging unit 2 are each formed, so as not to interfere with the first fixed claw 11 and the second fixed claw 31 when the imaging unit 2 is slid, into substantially a groove shape to extend in the full length of the sliding direction.

The third concave portion 23 and the fourth concave portion 24 are formed with sizes according to external sizes of the first movable claw 12 and the third movable claw 33 (e.g., sizes roughly equal to those of the first movable claw 12 and the third movable claw 33). With this configuration, when the first movable claw 12 and the third movable claw 33 fit into the third concave portion 23 and the fourth concave portion 24, the imaging unit 2 does not move in the sliding direction.

The user slides, while passing the first fixed claw 11 and the second fixed claw 31 through the first concave portion 21 and the second concave portion 22, the imaging unit 2 to be accommodated in the housing area. Then, when the imaging unit 2 is pressed to the first movable claw 12 and the second movable claw 32, the first movable claw 12 and the second movable claw 32 move to be automatically fitted into the third concave portion 23 and the fourth concave portion 24. Thus, the radiation imaging apparatus 9a according to the first exemplary embodiment of the present invention is set in the fourth state.

As the configuration to change the radiation imaging apparatus 9a according to the first exemplary embodiment of the present invention from the third state to the fourth state, additionally, a configuration where an opening through which the imaging unit 2 can be inserted is formed in the bottom 39 of the handle unit 3 can be employed.

The size of the opening is set smaller than the external size of the grid holding unit 1 and larger than the external size of the imaging unit 2. With this configuration, through this opening, from a side opposite the grid 18 (side opposite the surface irradiated with X-rays), the imaging unit 2 can be combined with the grid holding unit 1 and the handle unit 3.

To selectively take out one arbitrary unit from the radiation imaging apparatus 9a in the fourth state according to the first exemplary embodiment of the present invention, while maintaining one of the three detaching regulation units 71 to 73 in an engaged state, the remaining two are simultaneously released. A first unlocking mechanism 4 is disposed in the handle unit 3 of the radiation imaging apparatus 9a according to the first exemplary embodiment of the present invention.

The first unlocking mechanism 4 can change, by one operation, the combined state of the remaining two to a simultaneously released state while maintaining one of the three detaching regulation units 71 to 73 in the engaged state. In other word, the first unlocking mechanism 4 can move two of the first movable claw 12, the third movable claw 33, and the fourth movable claw 34 in association.

Thus, by one operation of the first unlocking mechanism 4, one arbitrary unit can be selectively taken out from the radiation imaging apparatus 9a in the fourth state according to the first exemplary embodiment of the present invention.

A specific configuration of the first unlocking mechanism 4 is as follows. The first unlocking mechanism 4 includes a first operation lever 41, a second operation lever 42, a third operation lever 43, and a connection portion 44.

The first operation lever 41, which is connected to the fourth movable claw 34 and the connection portion 44, can simultaneously move these parts. The second operation lever 42, which is connected to the third movable claw 33 and the fourth movable claw 34, can simultaneously move these portions. The third operation lever 43, which is connected to the third movable claw 33 and the connection portion 44, can simultaneously move these portions.

The connection portion 44 can be connected to the first movable claw 12 of the grid holding unit 1 to be separable. The operation levers 41, 42, and 43 are physically connected to the movable claws 12, 32, 33, and 34 and the connection portion 44 by wires.

The first movable claw 12 is provided not in the handle unit 3 but in the grid holding unit 1. Thus, connecting the first operation lever 41 to the first movable claw 12 and the third operation lever 43 to the first movable claw 12 by the connection portion 44 enables transmission of motion of the first operation lever 41 and the third operation lever 43 to the first movable claw 12. In the combined state of the grid holding unit 1 and the handle unit 3, the first movable claw 12, the first operation lever 41, and the third operation lever 43 are connected by the connection portion 44.

Therefore, when one of the first operation lever 41 and the third operation lever 43 is operated (e.g., pulled), the first movable claw 12 moves to exit from the housing area.

There is no limitation to the configuration of the connection portion 44. For example, a configuration where a claw or a projection is provided in one of the first movable claw 12 and the connection portion 44, and a concave portion is formed in the other to fit the claw or the projection in, can be employed.

Further, a configuration where a magnet is disposed in at least one of the first movable claw 12 and the connection portion 44, and the first movable claw 12 and the connection portion 44 are connected by a magnetic force can be employed. It is only required, therefore, that when the first operation lever 41 and the third operation lever 43 are operated (pulled), the first movable claw 12 move to exit from the housing area.

When the first operation lever 41 is operated (pulled), the first movable claw 12 of the grid holding unit 1 exits from the third concave portion 23 of the imaging unit 2, and the fourth movable claw 34 of the handle unit 3 exits from the second engaging hole 14 of the grid holding unit 1. The grid holding unit 1 is accordingly changed to a state to be separable from the imaging unit 2 and the handle unit 3.

However, the third movable claw 33 of the handle unit 3 is maintained in the fitted state in the fourth concave portion 24 of the imaging unit 2. This maintains the combined state of the imaging unit 2 and the handle unit 3. Thus, by one operation of the first operation lever 41, the radiation imaging apparatus 9a according to the first exemplary embodiment of the present invention can be changed from the fourth state to the second state.

When the second operation lever 42 is operated (pulled), the third movable claw 33 and the fourth movable claw 34 of the handle unit 3 exit from the fourth concave portion 24 of the imaging unit 2 and the second engaging hole 14 of the grid holding unit 1. The handle unit 3 is accordingly changed to a state to be separable from the grid holding unit 1 and the imaging unit 2.

However, since the first movable claw 12 is fitted in the third concave portion 23, the combined state of the grid holding unit 1 and the imaging unit 2 is maintained. Thus, by one operation of the second operation lever 42, the radiation imaging apparatus 9a according to the first exemplary embodiment of the present invention can be changed from the fourth state to the first state.

When the third operation lever 43 is operated (pulled), the first movable claw 12 of the grid holding unit 1 exits from the third concave portion 23 of the imaging unit 2, and the third movable claw 33 of the handle unit 3 exits from the second concave portion 24 of the imaging unit 2. The imaging unit 2 is accordingly changed to a state to be separable from the grid holding unit 1 and the handle unit 3.

However, the fourth movable claw 34 is fitted in the second engaging hole 14. Further, when the imaging unit 2 is removed, the second movable claw 32 is urged by the urging member to project, and reaches a position where the slope of the second movable claw 32 is not brought into contact with the grid holding unit 1. This maintains the combined state of the grid holding unit 1 and the handle unit 3.

Thus, by one operation of the first operation lever 41, the radiation imaging apparatus 9a according to the first exemplary embodiment of the present invention can be changed from the fourth state to the third state.

For the connection portion 44 of the first unlocking mechanism 4, as illustrated in FIG. 3, a claw may be formed in the first operation lever 41 and the third operation lever 43 to be engaged with the first movable claw 12. With this configuration, when one of the first operation lever 41 and the third operation lever 43 is operated, the two movable claws, i.e., one of the fourth movable claw 34 and the third movable claw 33, and the first movable claw 12, are simultaneously moved in association.

Two of the three movable claws must be operated in association while the remaining one must not be moved. Thus, to prevent physical interferences among the first to third operation levers 41 to 43, they are arranged in positions shifted from one another in a direction perpendicular to a paper surface illustrated in FIG. 3.

As described above, the radiation imaging apparatus 9a according to the first exemplary embodiment of the present invention can be set in all the first to fourth states.

Further, the radiation imaging apparatus 9a according to the first exemplary embodiment of the present invention can be changed among the first to fourth states by one operation of one of the first to third operation levers 41 to 43. As a result, operability of the operation of changing the state can be improved during changing of the imaging method.

In the radiation imaging apparatus 9a according to the first exemplary embodiment of the present invention, all the parts of the first unlocking mechanism 4 are arranged in the handle unit 3. With this configuration, there is no need to install the first unlocking mechanism 4 in the grid holding unit 1 or the imaging unit 2.

This prevents complicated structures of the grid holding unit 1 and the imaging unit 2. However, all the parts of the first unlocking mechanism 4 may not be arranged in the handle unit 3.

The radiation imaging apparatus 9a according to the first exemplary embodiment of the present invention has a configuration where the movable claws 12, 32, 33, and 34 are urged by the urging member. Thus, when the units are combined, the movable claws 12, 32, 33, and 34 automatically fit in the concave portions 21, 22, 23, and 24 or the engaging holes 13 and 14 without operating the operation levers 41, 42, and 43.

Thus, when the radiation imaging apparatus 9a according to the first exemplary embodiment of the present invention is changed from the fourth state to the first state, the second state, or the third state, or when the grid is replaced, the operation of recombining the separated units is extremely easy and fast.

The movable claws 12, 32, 33, and 34 may not be urged by the urging member. In a configuration where the movable claws 12, 32, 33, and 34 are not urged by the urging member, by operating the operation levers 41, 42, and 43, the movable claws 12, 32, 33, and 34 can be fitted into the concave portions 21, 22, 23, and 24 or the engaging holes 13 and 14.

With this configuration, there is no need to form any slopes at the leading ends of the movable claws 12, 32, 33, and 34. As a result, the movable claws 12, 32, 33, and 34 can be simplified in shape, and a mechanism for supporting the movable claws 12, 32, 33, and 34 can be simplified.

In this case, the movable claws 12, 32, 33, and 34 and the operation levers 41, 42, and 43 are connected by a member that can transmit the reciprocating movement of the operation levers 41, 42, and 43 to the movable claws 12, 32, 33, and 34.

These parts are connected by, for example, not a wire but a rigid member (rod-shaped member). This enables reciprocating movement of the movable claws 12, 32, 33, and 34 by operating the operation levers 41, 42, and 43 (e.g., pulling or pushing). The movable claws 12, 32, 33, and 34 can be fitted into or removed from the concave portions 21, 22, 23, and 24 and the engaging holes 13 and 14.

Figure 4:
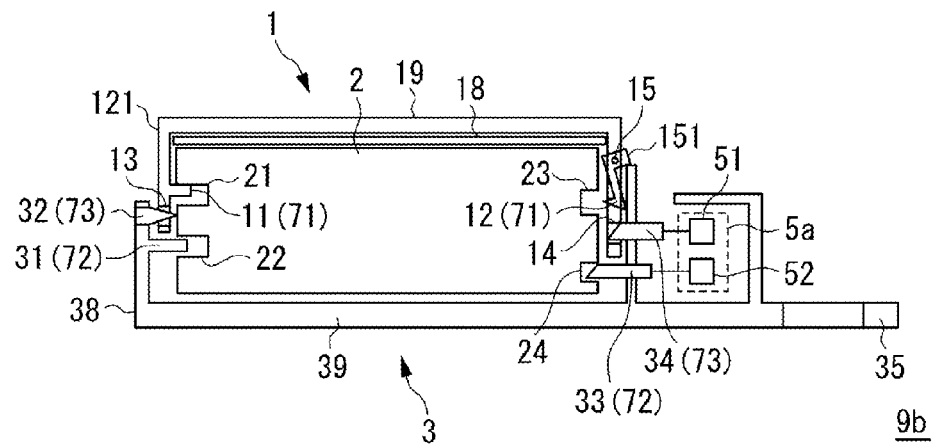
FIG. 4 is a sectional view schematically illustrating the configuration of the radiation imaging apparatus according to the second exemplary embodiment.
Figure 5:
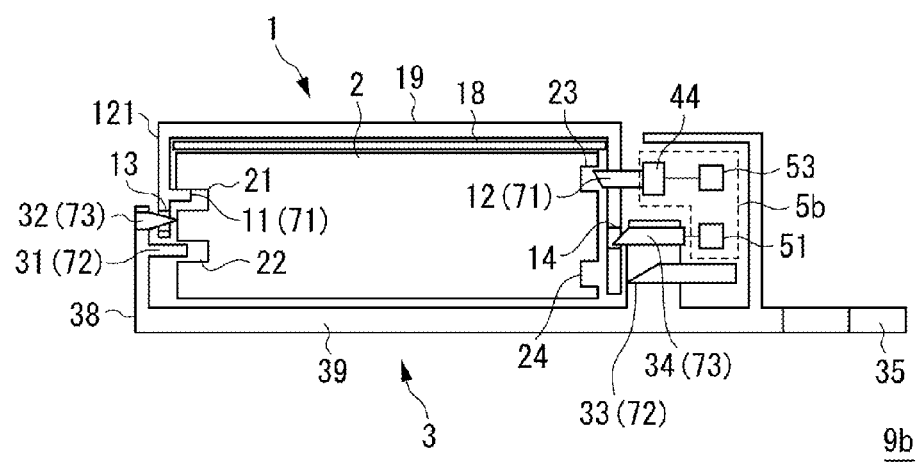
FIG. 5 is a sectional view schematically illustrating the configuration of the radiation imaging apparatus according to the second exemplary embodiment.
Figure 6:
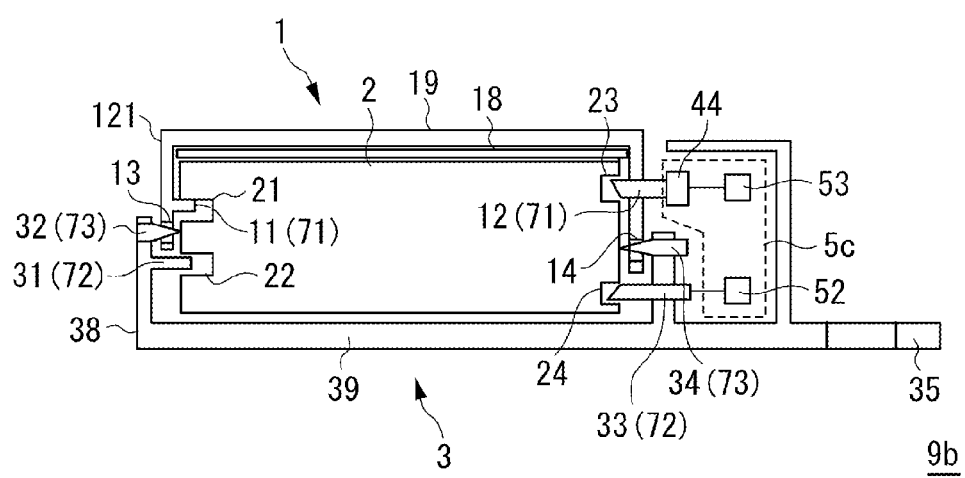
FIG. 6 is a sectional view schematically illustrating the configuration of the radiation imaging apparatus according to the second exemplary embodiment.

Next, a radiation imaging apparatus 9b according to a second exemplary embodiment of the present invention is described. Components similar to those of the first exemplary embodiment are denoted by similar reference numerals, and description thereof is omitted. FIGS. 4 to 6 are sectional views schematically illustrating a configuration of the radiation imaging apparatus 9b according to the second exemplary embodiment of the present invention. FIGS. 4 to 6 all illustrate a fourth state.

The three detaching regulation units 71 to 73 of the radiation imaging apparatus 9a according to the first exemplary embodiment of the present invention are all locked in the fourth state where three units, that is, the grid holding unit 1, the imaging unit 2, and the handle unit 3, are combined.

On the other hand, one of three detaching regulation units 71 to 73 of the radiation imaging apparatus 9b according to the second exemplary embodiment of the present invention is unlocked in the fourth state where the three units are combined. With this configuration, while the mechanism of moving the movable claws 12, 33, and 34 in association is necessary in the first exemplary embodiment of the present invention, such a mechanism is unnecessary in the second exemplary embodiment of the present invention. As a result, the configuration of the first unlocking mechanism 4 can be simplified.

FIG. 4 illustrates a configuration where by a handle unit 3, a state is changed to a state of releasing a combined state of the grid holding unit 1 and an imaging unit 2 by a first movable claw 12. As illustrated in FIG. 4, the first movable claw 12 of the grid holding unit 1 is disposed to be rotated with respect to a frame 19 with a hinge 15.

The first movable claw 12 can move to a position of entering into a housing area and a position of exiting from the housing area by rotation. At a base end of the first movable claw 12, an operation unit 151 is disposed to project outside a side wall 121.

During combining the grid holding unit 1 and the handle unit 3, the operation unit 151 is pressed in a surface direction of the side wall 121 of the grid holding unit 1 by a side wall 38 of the handle unit 3. When this operation unit 151 is pressed in the surface direction of the side wall 121, the first movable claw 12 rotates. As a result, a leading end of the first movable claw 12 moves to the position of exiting from the housing area.

The handle unit 3 includes a second unlocking mechanism 5a. The second unlocking mechanism 5a includes a fourth operation lever 51 and a fifth operation lever 52. The fourth operation lever 51 can move a fourth movable claw 34. The fifth operation lever 52 can move a third movable claw 33. The fourth operation lever 51 and the fifth operation lever 52 are not interlocked with each other.

With this configuration, a user can take out the grid holding unit 1 from the imaging unit 2 and the handle unit 3 only by operating the fourth operation lever 51 to remove the third movable claw 33 from the fourth concave portion 24. In other words, the user can change the radiation imaging apparatus 9b according to the second exemplary embodiment of the present invention from a fourth state to a second state.

Similarly, the user can take out the imaging unit 2 from the grid holding unit 1 and the handle unit 3 only by operating the fifth operation lever 52 to remove the fourth movable claw 34 from the second engaging hole 14. In other words, the user can change the radiation imaging apparatus 9b according to the second exemplary embodiment of the present invention from the fourth state to the third state.

However, to remove the handle unit 3 from the grid holding unit 1 and the imaging unit 2 (to change from the fourth state to the first state), the two levers, that is, the fourth operation lever 51 and the second operation lever 52, must be operated.

FIG. 5 illustrates a sectional view schematically illustrating a configuration where by the grid holding unit 1, a state is changed to a state of releasing a combined state of the imaging unit 2 and the handle unit 3.

As illustrated in FIG. 5, the handle unit 3 includes a third unlocking mechanism 5b. A fourth operation lever 51 and a sixth operation lever 53 are arranged therein. The fourth operation lever 51 can move the fourth movable claw 34. The sixth operation lever 53 can move the fourth movable claw 34. The fourth operation lever 51 and the sixth operation lever 53 are not interlocked with each other.

No lever is provided to operate the third operation lever 33. As illustrated in FIG. 5, during combining the grid holding unit 1 and the handle unit 3, the side wall 121 of the grid holding unit 1 presses the third movable claw 33 to exit from the housing area. The third movable claw 33 is accordingly removed from the second concave portion 24 of the imaging unit 2.

With this configuration, the user can take out the imaging unit 2 from the grid holding unit 1 and the handle unit 3 only by operating the sixth operation lever 53 to remove the first movable claw 12 from the third concave portion 23. In other words, the user can change the radiation imaging apparatus 9b according to the second exemplary embodiment of the present invention from the fourth state to the third state.

Similarly, the user can take out the handle unit 3 from the grid holding unit 1 and the imaging unit 2 only by operating the fourth operation lever 51 to disengage the fourth movable claw 34. In other words, the user can change the radiation imaging apparatus 9b according to the second exemplary embodiment of the present invention from the fourth state to the first state.

However, to remove the grid holding unit 1 from the imaging unit 2 and the handle unit 3 (to change from the fourth state to the second state), the two levers, that is, the fourth operation lever 51 and the sixth operation lever 53, must be operated.

FIG. 6 is a sectional view schematically illustrating a configuration where by the imaging unit 2, the combined state of the grid holding unit 1 and the handle unit 3 is released.

As illustrated in FIG. 6, in the first state, the imaging unit 2 presses the fourth movable claw 34 disposed in the handle unit 3. A slope formed in the fourth movable claw 34 is located inside the second engaging hole 14 formed in the grid holding unit 1.

Further, as illustrated in FIG. 6, the handle unit 3 includes a fourth unlocking mechanism 5c. The fourth unlocking mechanism 5c includes a fifth operation lever 52 and a sixth operation lever 53.

With this configuration, during removal of the grid holding unit 1, an inner peripheral surface of the second engaging hole 14 formed in the grid holding unit 1 presses the slope formed in the fourth movable claw 34. The pressed fourth movable claw 34 is moved by a force component perpendicular to the side wall.

Thus, the user can take out the grid holding unit 1 from the imaging unit 2 and the handle unit 3 only by operating the sixth operation lever 53. In other words, the user can change the radiation imaging apparatus 9b according to the second exemplary embodiment of the present invention from the fourth state to the second state.

Similarly, the user can take out the handle unit 3 from the grid holding unit 1 and the imaging unit 2 only by operating the fifth operation lever 52. In other words, the user can change the radiation imaging apparatus 9b according to the second exemplary embodiment of the present invention from the fourth state to the first state.

However, to remove the imaging unit 2 from the grid holding unit 1 and the handle unit 3 (to change from the fourth state to the third state), the two levers, that is, the fifth operation lever 52 and the sixth operation lever 53, must be operated.

As described above, in the radiation imaging apparatus 9b according to the second exemplary embodiment of the present invention, one of the three units can be removed from other two units. The radiation imaging apparatus 9b according to the second exemplary embodiment of the present invention can be simplified in configuration more than the radiation imaging apparatus 9a according to the first exemplary embodiment of the present invention.

This can achieve size reduction and low cost for the radiation imaging apparatus 9b according to the second exemplary embodiment of the present invention.

Specific one of the three units cannot be removed by one unlocking operation. Thus, a unit permitted to be removed and a unit inhibited to be removed by one operation may be determined according to a user's purpose.

For example, the configuration illustrated in FIG. 4 where the removal of the handle unit 3 needs two lever operations can be applied to a basically portable radiation imaging apparatus used as a stationary type by setting only the imaging unit 2 in a bucky.

The configuration illustrated in FIG. 5 where the removal of the imaging unit 2 needs two lever operations can be applied, for example, to a portable radiation imaging apparatus mainly used beside a bed.

The configuration illustrated in FIG. 6 where the removal of the handle unit 3 needs two lever operations can be applied to a stationary radiation imaging apparatus used beside the bed specifically for capturing an image of an identified region.

Next, a third exemplary embodiment of the present invention is described. Components similar to those of the first exemplary embodiment are denoted by similar reference numerals, and description thereof is omitted.

Figure 7A:
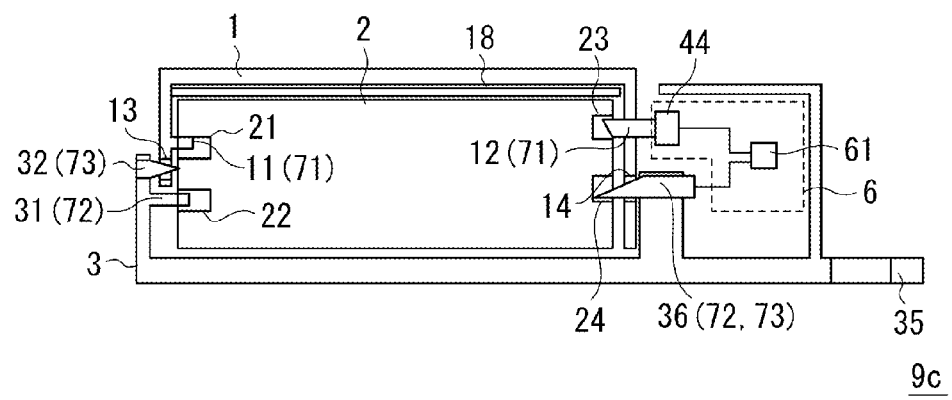
FIGS. 7A and 7B are sectional views schematically illustrating the configuration of the radiation imaging apparatus according to the third exemplary embodiment.
Figure 7B:
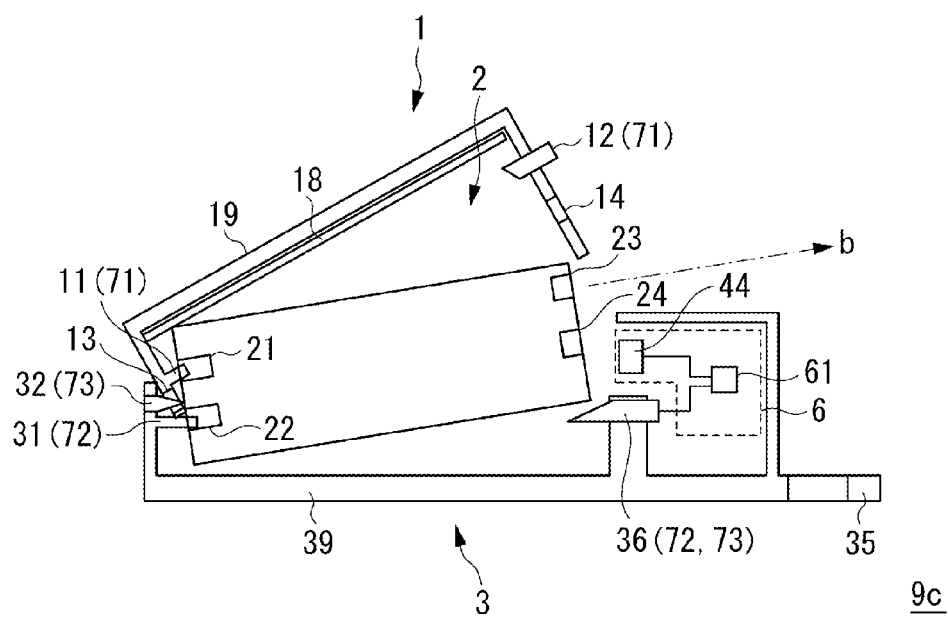

FIG. 7A is a sectional view schematically illustrating a configuration of a radiation imaging apparatus 9c according to the third exemplary embodiment of the present invention. FIG. 7B is a sectional view illustrating the configuration of the radiation imaging apparatus 9c according to the third exemplary embodiment of the present invention in a state where each unit is separable.

Each of the radiation imaging apparatus 9a and the radiation imaging apparatus 9b according to the first and second exemplary embodiments of the present invention includes the two operation levers. On the other hand, the radiation imaging apparatus 9c according to the third exemplary embodiment of the present invention is configured so that one arbitrary unit can selectively be removed by one lever operation.

As illustrated in FIGS. 7A and 7B, the handle unit 3 includes a fifth movable claw 36 and a fifth unlocking mechanism 6. The fifth movable claw 36 can fix the grid holding unit 1 and an imaging unit 2. In other words, in the fourth state, the fifth movable claw 36 penetrates the second engaging hole 14 formed in the grid holding unit 1 to fit in a fourth concave portion 24 formed in an imaging unit 2.

The fifth unlocking mechanism 6 includes a seventh operation lever 61 and the connection unit 44. The fifth unlocking mechanism 6 and the connection unit 44 are connected to the seventh operation lever 61. The connection unit 44 connects the seventh operation lever 61 and the first movable claw 12 to be separable.

In the fourth state, the seventh operation lever 61 and the first movable claw 12 are connected by the connection unit 44. Thus, when the seventh operation lever 61 is operated, the first movable claw 12 and a fifth movable claw 36 simultaneously move in association.

This configuration can achieve the second state where the imaging unit 2 and the handle unit 3 are combined and the third state where the grid holding unit 1 and the handle unit 3 are combined. Each of the second detaching regulation unit 72 and the third detaching regulation unit 73 includes the fifth movable claw 36.

The grid holding unit 1 includes the first movable claw 12 engaged with the imaging unit 2. The first movable claw 12 configured to reciprocate with respect to the side wall 121 can move to a position where its leading end projects into a housing area and a position where it exits. The first movable claw 12 fits in the third concave portion 23 of the imaging unit 2 in the first state and the fourth state.

Thus, the radiation imaging apparatus 9c according to the third exemplary embodiment of the present invention can achieve the first state where the grid holding unit 1 and the imaging unit 2 are combined by the second movable claw 32. A first detaching regulation unit 71 accordingly includes the first movable claw 12.

The connection unit 44 connects the seventh operation lever 61 and the first movable claw 12 to be separable. In the third state or the fourth state, the connection unit 44 connects the first movable claw 12 and the fourth operation lever 51. As a result, when the seventh operation lever 61 is operated in the fourth state, the combined states of all the units are released.

However, the first fixed claw 11 of the grid holding unit 1 fits in the first concave portion 21 of the imaging unit 2, and the second fixed claw 31 of the handle unit 3 fits in the second concave portion 22 of the imaging unit 2.

Further, a second movable claw 32 of the handle unit 3 fits in the first engaging hole 13 of the grid holding unit 1. This prevents immediate separation of the three units even when the seventh operation lever 61 is operated.

As illustrated in FIG. 7B, a user operates the seventh operation lever 61 to separate the grid holding unit 1 and the imaging unit 2 from the handle unit 3. In this case, the first fixed claw 11, the second fixed claw 31, and the second movable claw 32 are respectively maintained fitted in the first concave portion 21, the second concave portion 22, and the first engaging hole 13. This enables the user to remove one desired unit from the other two units.

The first concave portion 21, the second concave portion 22, and the first engaging hole 13 of the imaging unit 2 are set approximately equal in size to, for example, the first fixed claw 11, the second fixed claw 31, and the second movable claw 32.

This configuration prevents positional shifting of the grid holding unit 1 and the imaging unit 2 in a horizontal direction (direction perpendicular to paper surfaces illustrated in FIGS. 7A and 7B) with respect to the handle unit 3. As a result, after one specific unit is removed from the other two units, the units can be recombined without positioning the other two units.

Thus, the first fixed claw 11 of the grid holding unit 1 and the first concave portion 21 of the imaging unit 2 constitute a guiding mechanism for holding a positional relationship to recombine the grid holding unit 1 and the imaging unit 2.

The second fixed claw 31 of the handle unit 3 and the second concave portion 22 of the imaging unit 2 constitute a guiding mechanism for holding a positional relationship to recombine the handle unit 3 and the imaging unit 2. The second movable claw 32 of the handle unit 3 and the first engaging hole 13 of the grid holding unit 1 constitute a guiding mechanism for holding a positional relationship to recombine the handle unit 3 and the grid holding unit 1.

These guiding mechanisms hold, even after the first detaching regulation unit 71, the second detaching regulation unit 72, and the third detaching regulation unit 73 have been released, the positional relationships to recombine the grid holding unit 1, the imaging unit 2, and the handle unit 3.

An operation of taking out (operation of changing the state to the second state) the grid holding unit 1 from the radiation imaging apparatus 9c according to the third exemplary embodiment of the present invention in the fourth state is as follows.

First, the seventh operation lever 61 is operated to disengage the movable claw 12 and the third concave portion 23 of the imaging unit 2 from each other and the fifth movable claw 36 and the fourth concave portion 24 of the imaging unit 2 from each other. Then, the radiation imaging apparatus 9c according to the third exemplary embodiment of the present invention is set to the state illustrated in FIG. 7B.

Then, the imaging unit 2 and the handle unit 3 are combined to remove the grid holding unit 1. As a result, the radiation imaging apparatus 9c according to the third exemplary embodiment of the present invention is changed from the fourth state to the second state.

An operation of taking out the imaging unit 2 from the radiation imaging apparatus 9c according to the third exemplary embodiment of the present invention in the fourth state is as follows.

First, after the apparatus has been set in the state illustrated in FIG. 7B by the above operation, the imaging unit 2 is pulled out in an arrow direction b. Then, the grid holding unit 1 and the handle unit 3 are recombined. As a result, the radiation imaging apparatus 9c according to the third exemplary embodiment of the present invention is changed from the fourth state to the third state.

To remove the handle unit 3 from the radiation imaging apparatus 9c according to the third exemplary embodiment of the present invention in the fourth state, after the apparatus has been set in the state illustrated in FIG. 7B by the above operation, the grid holding unit 1 and the imaging unit 2 are recombined, and the handle unit 3 is removed. As a result, the radiation imaging apparatus 9c according to the third exemplary embodiment of the present invention is changed from the fourth state to the first state.

As described above, in the radiation imaging apparatus 9c according to the third exemplary embodiment of the present invention, only by operating the seventh operation lever 61, one arbitrary unit can selectively be removed. Further, the other two units can be combined without being aligned again. With this configuration, only one seventh operation lever 61 needs to be provided. Thus, operation mistakes can be prevented.

The exemplary embodiments of the present invention have been described referring to the accompanying drawings. However, the exemplary embodiments are in no way limitative of the present invention. Various changes can be made without departing from the spirit and scope of the present invention. The present invention is suitable to a portable radiation imaging apparatus. Not limited to the portable radiation imaging apparatus, however, the present invention can be applied to various imaging apparatuses.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-129539 filed Jun. 9, 2011, which is hereby incorporated by reference herein in its entirety.

What is claimed is:

1. A radiation imaging apparatus comprising:
a grid holding unit including a grid for preventing scattering of X-rays;
an imaging unit configured to capture an X-ray image; and
a handle unit including a gripping handle,
wherein one of the grid holding unit, the imaging unit, and the handle unit includes:
a first detaching regulation unit configured to combine the grid holding unit and the imaging unit to be separable;
a second detaching regulation unit configured to combine the imaging unit and the handle unit to be separable;
a third detaching regulation unit configured to combine the grid holding unit and the handle unit to be separable; and
a releasing mechanism configured to release, by one releasing operation, while maintaining a combined state of one of the first detaching regulation unit, the second detaching regulation unit, and the third detaching regulation unit, combined states of the remaining two units.

2. The radiation imaging apparatus according to claim 1, wherein in a combined state of all the grid holding unit, the imaging unit, and the handle unit, a combined state of one of the first detaching regulation unit, the second detaching regulation unit, and the third detaching regulation unit is released.

3. The radiation imaging apparatus according to claim 1, wherein:
the first detaching regulation unit includes a concave portion formed in one of the grid holding unit and the imaging unit, and a movable claw formed in the other unit of the grid holding unit and the imaging unit to fit in the concave portion;
the second detaching regulation unit includes a second concave portion formed in one of the imaging unit and the handle unit, and a second movable claw formed in the other unit of the imaging unit and the handle unit to fit in the second concave portion; and
the third detaching regulation unit includes an engaging hole formed in one of the grid holding unit and the handle unit, and the second movable claw formed in the other of the grid holding unit and the handle unit to reciprocate and fit in the engaging hole.

4. The radiation imaging apparatus according to claim 1, wherein the releasing mechanism is disposed in the handle unit.

5. The radiation imaging apparatus according to claim 1, wherein:
the first detaching regulation unit includes a concave portion formed in one of the grid holding unit and the imaging unit, and a movable claw formed in the other of the grid holding unit and the imaging unit to fit in the concave portion; and
the second detaching regulation unit and the third detaching regulation unit include an engaging hole formed in the grid holding unit, a second concave portion formed in the imaging unit, and another movable claw formed in the handle unit to fit in the engaging hole and the second concave portion, and have a guiding mechanism for holding, even after the first detaching regulation unit, the second detaching regulation unit, and the third detaching regulation unit are released, a positional relationship to recombine the grid holding unit, the imaging unit, and the handle unit.

6. The radiation imaging apparatus according to claim 1, wherein the first detaching regulation unit, the second detaching regulation unit, and the third detaching regulation unit automatically combine the grid holding unit, the imaging unit, and the handle unit.

7. The radiation imaging apparatus according to claim 1, further comprising:
a first operation lever configured to simultaneously release the combined state by the first detaching regulation unit and the combined state by the second detaching regulation unit;
a second operation lever configured to simultaneously release the combined state by the second detaching regulation unit and the combined state by the third detaching regulation unit; and
a third operation lever configured to simultaneously release the combined state by the first detaching regulation unit and the combined state by the third detaching regulation unit.

8. A radiation imaging apparatus comprising:
a grid holding unit including a grid for preventing scattering of X-rays;
an imaging unit configured to capture an X-ray radiation generated by an X-ray source; and
a handle unit including a gripping handle,
wherein each of the grid holding unit and the handle unit includes a convex portion and a movable claw;
wherein the imaging detector includes a plurality of concave portions configured to engage with the convex portion and the movable claw of at least one of the grid holding unit and the handle unit;
wherein the grid holding unit, the imaging unit and the handle unit are configured to be selectively assembled in a plurality of states, including:
a first state where the grid holding unit and the imaging unit are combined to be separable,
a second state in which the imaging unit and the handle unit are combined to be separable,
a third state where the grid holding unit and the handle unit are combined to be separable, and
a fourth state in which the grid holding unit, the imaging unit and the handle unit are combined to be separable.

9. A radiation imaging apparatus comprising:
a grid holding unit including a grid for preventing scattering of X-rays;
an imaging unit configured to capture an X-ray image;
a handle unit including a gripping handle;
a first detaching regulation unit configured to separably combine the grid holding unit to an imaging surface of the imaging unit; and
a second detaching regulation unit configured to separably combine the handle unit to a surface opposed to the imaging surface of the imaging unit.

10. The radiation imaging apparatus according to claim 9, further comprising:
a third detaching regulation unit configured to combine the grid holding unit and the handle unit to be separable.

11. The radiation imaging apparatus according to claim 10, further comprising:
a releasing mechanism configured to release, by one releasing operation, while maintaining a combined state of one of the first detaching regulation unit, the second detaching regulation unit, and the third detaching regulation unit, combined states of the remaining two units.

12. The radiation imaging apparatus according to claim 11, wherein in a combined state of all the grid holding unit, the imaging unit, and the handle unit, a combined state of one of the first detaching regulation unit, the second detaching regulation unit, and the third detaching regulation unit is released.

13. The radiation imaging apparatus according to claim 12, wherein the first detaching regulation unit includes a concave portion formed in one of the grid holding unit and the imaging unit, and a movable claw formed in the other unit of the grid holding unit and the imaging unit to fit in the concave portion, and
wherein the second detaching regulation unit includes a second concave portion formed in one of the imaging unit and the handle unit, and a second movable claw formed in the other unit of the imaging unit and the handle unit to fit in the second concave portion.

14. The radiation imaging apparatus according to claim 10, wherein the third detaching regulation unit includes an engaging hole formed in one of the grid holding unit and the handle unit, and the second movable claw formed in the other of the grid holding unit and the handle unit to reciprocate and fit in the engaging hole.

15. The radiation imaging apparatus according to claim 11, wherein the releasing mechanism is disposed in the handle unit.

16. The radiation imaging apparatus according to claim 14, wherein the first detaching regulation unit includes a concave portion formed in one of the grid holding unit and the imaging unit, and a movable claw formed in the other of the grid holding unit and the imaging unit to fit in the concave portion, and
wherein the second detaching regulation unit and the third detaching regulation unit include an engaging hole formed in the grid holding unit, a second concave portion formed in the imaging unit, and another movable claw formed in the handle unit to fit in the engaging hole and the second concave portion, and have a guiding mechanism for holding, even after the first detaching regulation unit, the second detaching regulation unit, and the third detaching regulation unit are released, a positional relationship to recombine the grid holding unit, the imaging unit, and the handle unit.

17. The radiation imaging apparatus according to claim 10, wherein the first detaching regulation unit, the second detaching regulation unit, and the third detaching regulation unit automatically combine the grid holding unit, the imaging unit, and the handle unit.

18. The radiation imaging apparatus according to claim 10, further comprising:
a first operation lever configured to simultaneously release the combined state by the first detaching regulation unit and the combined state by the second detaching regulation unit;
a second operation lever configured to simultaneously release the combined state by the second detaching regulation unit and the combined state by the third detaching regulation unit; and
a third operation lever configured to simultaneously release the combined state by the first detaching regulation unit and the combined state by the third detaching regulation unit.

* * * * *